US012703244B2

(12) United States Patent
Kumazaki

(10) Patent No.: US 12,703,244 B2
(45) Date of Patent: Aug. 11, 2026

(54) DISPLAY CONTROLLER, METHOD, AND COMPUTER PROGRAM FOR CONTROLLING DISPLAY, AND SOUND CONTROLLER

(71) Applicant: TOYOTA JIDOSHA KABUSHIKI KAISHA, Toyota (JP)

(72) Inventor: Kenta Kumazaki, Bunkyo-ku (JP)

(73) Assignee: TOYOTA JIDOSHA KABUSHIKI KAISH., Toyota (JP)

( * ) Notice: Subject to any disclaimer, the term of this patent is extended or adjusted under 35 U.S.C. 154(b) by 0 days.

(21) Appl. No.: 19/037,377

(22) Filed: Jan. 27, 2025

(65) Prior Publication Data

US 2025/0249745 A1 Aug. 7, 2025

(30) Foreign Application Priority Data

Feb. 1, 2024 (JP) ................................ 2024-014086

(51) Int. Cl.

| | |
|---|---|
| ***B60K 35/28*** | (2024.01) |
| ***B60K 35/22*** | (2024.01) |
| ***B60K 35/81*** | (2024.01) |
| ***G06F 3/01*** | (2006.01) |
| ***G07C 5/02*** | (2006.01) |
| ***G10K 15/02*** | (2006.01) |

(52) U.S. Cl.

CPC .............. *B60K 35/28* (2024.01); *B60K 35/22* (2024.01); *B60K 35/81* (2024.01); *G06F 3/013* (2013.01); *G07C 5/02* (2013.01); *G10K 15/02* (2013.01); *B60K 2360/167* (2024.01)

(58) Field of Classification Search

None

See application file for complete search history.

(56) References Cited

U.S. PATENT DOCUMENTS

| | | | | |
|---|---|---|---|---|
| 2002/0133285 A1* | 9/2002 | Hirasago | B60K 35/10 | 180/170 |
| 2006/0015240 A1* | 1/2006 | Shima | B60W 30/16 | 701/93 |
| 2012/0188068 A1* | 7/2012 | Hanna | B60W 10/26 | 340/455 |
| 2015/0109756 A1* | 4/2015 | Choi | G01D 7/002 | 362/23.01 |
| 2016/0019792 A1* | 1/2016 | Kawamata | G07C 5/085 | 701/70 |

FOREIGN PATENT DOCUMENTS

| | | |
|---|---|---|
| JP | H11-230976 A | 8/1999 |
| JP | 2013-113720 A | 6/2013 |
| JP | 2017-087873 A | 5/2017 |

* cited by examiner

*Primary Examiner* — Parul H Gupta

(74) *Attorney, Agent, or Firm* — Dinsmore & Shohl LLP

(57) ABSTRACT

A display controller includes a processor configured to cause a display device to display vehicle speed so that the displayed vehicle speed increases during accelerating of a vehicle and decreases during coasting of the vehicle within a displayed speed range that is included in and narrower than a predetermined actual speed range while the vehicle is under pulse and glide driving control to repeat accelerating and coasting within the actual speed range.

5 Claims, 5 Drawing Sheets

TO IN-VEHICLE NETWORK
17
21
22
23
COMMUNICATION INTERFACE
MEMORY
PROCESSOR
ECU
12
15
10
14
17
13
16
11

FIG. 4

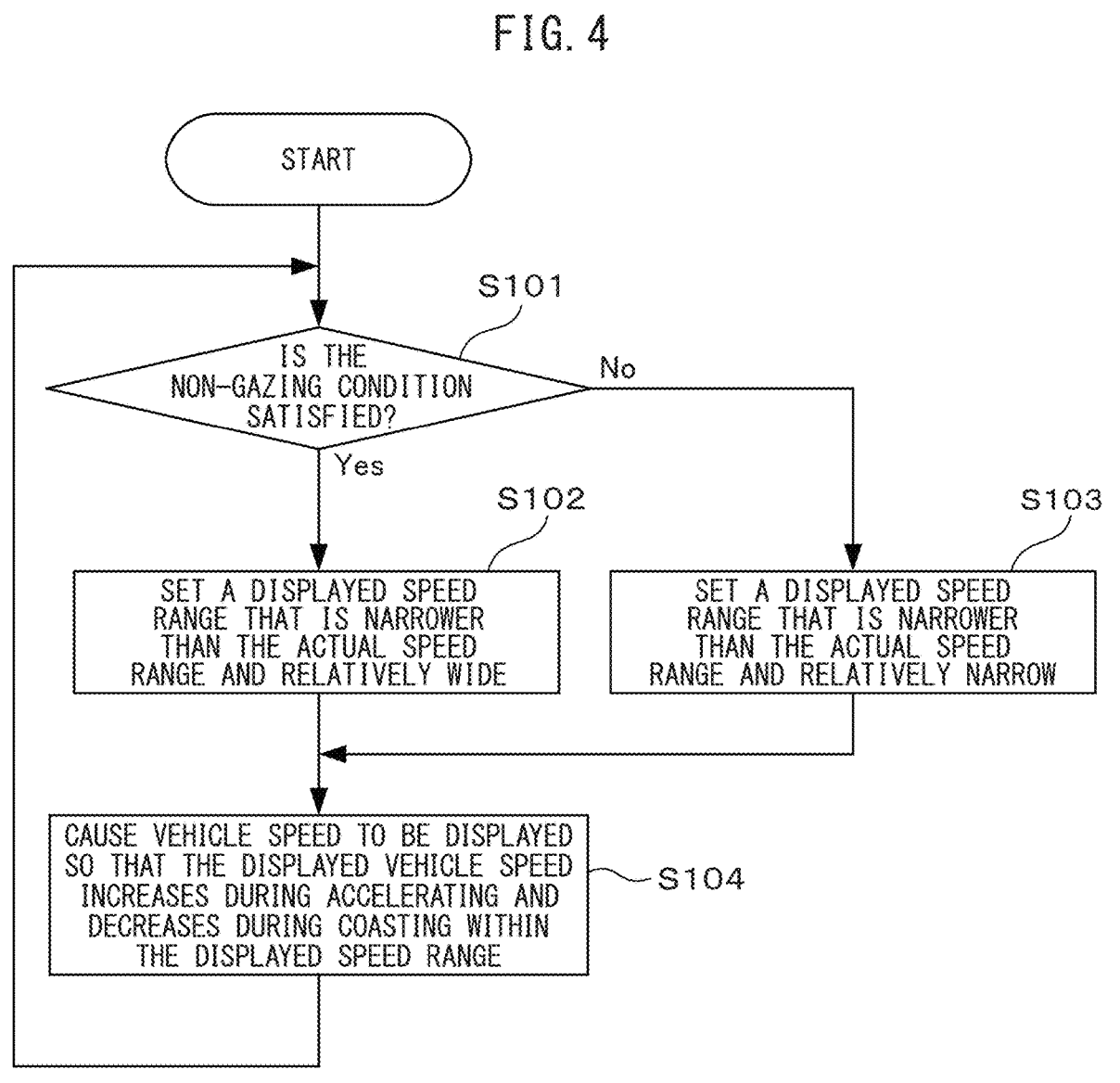

START

S101

IS THE NON-GAZING CONDITION SATISFIED?

No

Yes

S102

SET A DISPLAYED SPEED RANGE THAT IS NARROWER THAN THE ACTUAL SPEED RANGE AND RELATIVELY WIDE

S103

SET A DISPLAYED SPEED RANGE THAT IS NARROWER THAN THE ACTUAL SPEED RANGE AND RELATIVELY NARROW

CAUSE VEHICLE SPEED TO BE DISPLAYED SO THAT THE DISPLAYED VEHICLE SPEED INCREASES DURING ACCELERATING AND DECREASES DURING COASTING WITHIN THE DISPLAYED SPEED RANGE

S104

DISPLAY CONTROLLER, METHOD, AND COMPUTER PROGRAM FOR CONTROLLING DISPLAY, AND SOUND CONTROLLER

CROSS-REFERENCE TO RELATED APPLICATIONS

This application claims priority to Japanese Patent Application No. 2024-014086 filed Feb. 1, 2024, the entire contents of which are herein incorporated by reference.

FIELD

The present disclosure relates to a display controller, a method, and a computer program for controlling display of speed in a vehicle, and a sound controller that controls a sound produced in the vehicle interior during predetermined travel of the vehicle.

BACKGROUND

It is known that fuel consumption can be reduced by intermittent driving in which a vehicle repeats accelerating and coasting within a predetermined speed range (also referred to as pulse and glide driving). A technique to prevent fluctuations in display of speed caused by changes in speed during such intermittent driving of a vehicle has been proposed (see Japanese Unexamined Patent Publication No. 2013-113720).

In the proposed technique, a display for a vehicle fixes and displays controlled vehicle speed during intermittent driving of the vehicle, and also displays actual vehicle speed and the state of acceleration/deceleration during intermittent driving.

SUMMARY

If display of speed is fixed during pulse and glide driving of a vehicle, the difference between displayed vehicle speed and actual vehicle speed may make a driver who is sensitive to changes in speed feel a sense of incongruity because the vehicle speed actually varies.

It is an object of the present disclosure to provide a display controller that can reduce fluctuations in display of vehicle speed and a driver's sense of incongruity during pulse and glide driving of a vehicle.

A display controller according to an embodiment includes a processor configured to: cause a display device to display vehicle speed so that the displayed vehicle speed increases during accelerating of a vehicle and decreases during coasting of the vehicle within a displayed speed range that is included in and narrower than a predetermined actual speed range while the vehicle is under pulse and glide driving control to repeat accelerating and coasting within the actual speed range.

In an embodiment, the processor of the display controller is further configured to determine whether circumstances of the vehicle or behavior of a driver of the vehicle satisfies a non-gazing condition that the driver does not gaze at the display device. The processor sets the displayed speed range so that the displayed speed range when the non-gazing condition is satisfied is wider than the displayed speed range when the non-gazing condition is not satisfied.

In an embodiment, when the pulse and glide driving control is terminated, the processor controls the display device to bring the displayed vehicle speed close to actual speed of the vehicle at a rate of change that is less than or equal to a predetermined upper-limit rate of change.

A sound controller according to another embodiment includes a processor configured to: cause a sound generator mounted on a vehicle to output an artificial acceleration sound, which is artificial reproduction of a sound made during accelerating of the vehicle, in the interior of the vehicle during coasting of the vehicle while the vehicle is under pulse and glide driving control to repeat the accelerating and the coasting within a predetermined actual speed range.

In an embodiment, the processor makes volume of the artificial acceleration sound lower as noise made during travel of the vehicle is louder.

A method for controlling display according to still another embodiment includes causing a display device to display vehicle speed so that the displayed vehicle speed increases during accelerating of a vehicle and decreases during coasting of the vehicle within a displayed speed range that is included in and narrower than a predetermined actual speed range while the vehicle is under pulse and glide driving control to repeat accelerating and coasting within the actual speed range.

A non-transitory recording medium that stores a computer program for controlling display according to yet another embodiment includes instructions causing a processor mounted on a vehicle to execute a process including causing a display device to display vehicle speed so that the displayed vehicle speed increases during accelerating of the vehicle and decreases during coasting of the vehicle within a displayed speed range that is included in and narrower than a predetermined actual speed range while the vehicle is under pulse and glide driving control to repeat accelerating and coasting within the actual speed range.

The display controller according to the present disclosure has an advantageous effect of being able to reduce fluctuations in display of vehicle speed and a driver's sense of incongruity during pulse and glide driving of a vehicle.

BRIEF DESCRIPTION OF DRAWINGS

FIG. 4 is an operation flowchart of the display control process according to the first embodiment.

DESCRIPTION OF EMBODIMENTS

A display controller, a method for controlling display executed by the display controller, a computer program for controlling display, a sound controller, a method for controlling sound executed by the sound controller, and a computer program for controlling sound will now be described with reference to the attached drawings. The display controller sets the range of changes in vehicle speed displayed to a driver (hereafter a "displayed speed range") narrower than a predetermined actual speed range while the vehicle is under pulse and glide driving control to repeat accelerating and coasting within the actual speed range. The sound controller causes a sound generator to produce an artificial acceleration sound, which is artificial reproduction of a sound made during accelerating, during coasting while the vehicle is under pulse and glide driving control. In the following, pulse and glide driving control will be referred to as "PG driving control."

Figure 1:
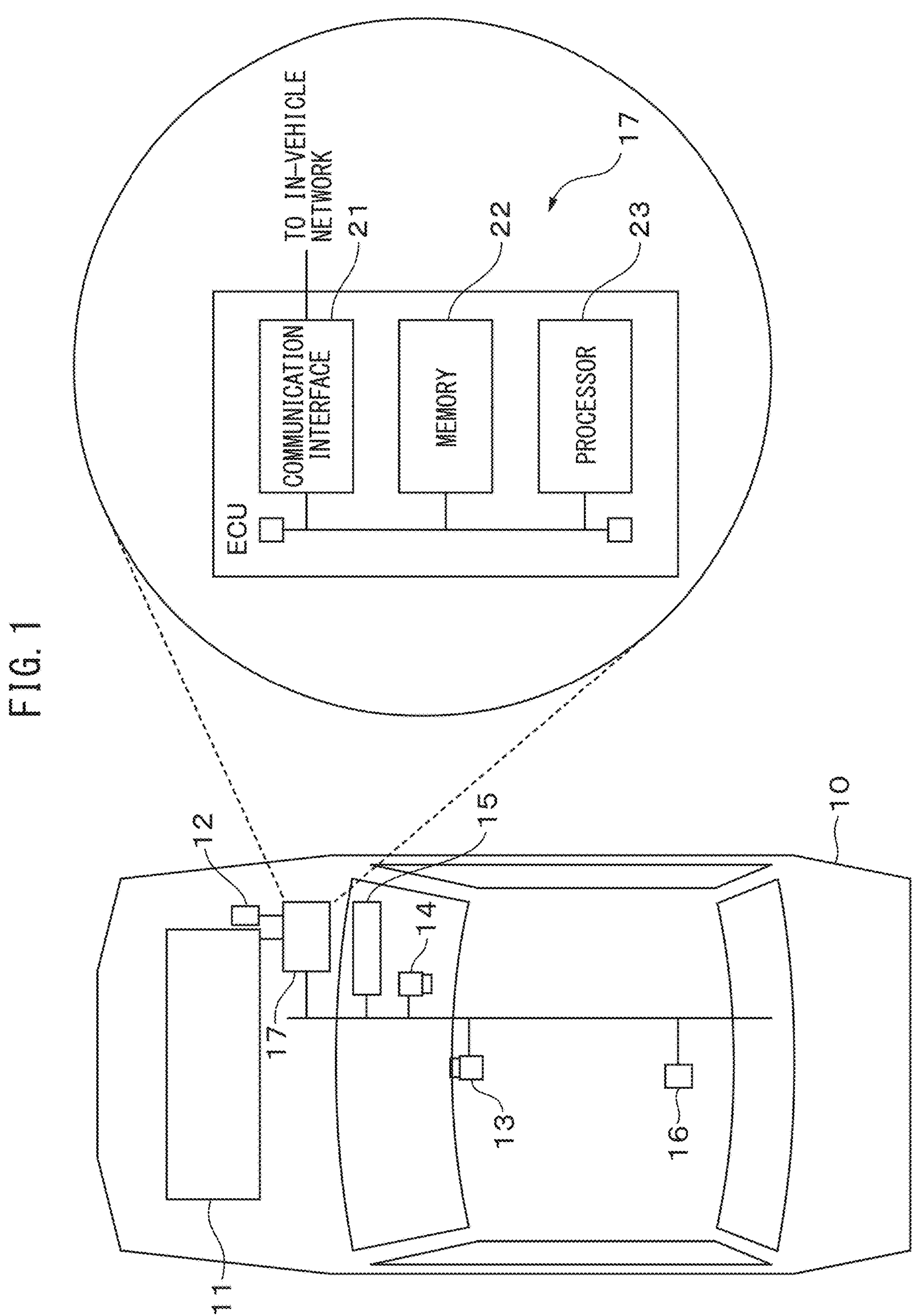
FIG. 1 schematically illustrates the configuration of a vehicle equipped with an electronic control unit that is an example of the display controller or the sound controller.

FIG. 1 schematically illustrates the configuration of a vehicle equipped with an electronic control unit that is an example of the display controller or the sound controller. In the present embodiment, the vehicle 10 may be a vehicle whose power train 11 includes a motor as a power source, such as a battery electric vehicle or a hybrid or plug-in hybrid vehicle, in terms of improvement in fuel consumption by PG driving control. However, the vehicle 10 may be a vehicle whose power train 11 includes only a power source other than a motor, such as an engine. The vehicle 10 includes a vehicle speed sensor 12, a vehicle exterior sensor 13, a driver monitoring camera 14, a display device 15, a sound generator 16, and an electronic control unit (ECU) 17.

The vehicle speed sensor 12 measures the speed of the vehicle 10, generates a speed signal indicating the speed of the vehicle 10, and outputs the speed signal to the ECU 17.

The vehicle exterior sensor 13 is a sensor that generates an exterior sensor signal representing the surroundings of the vehicle 10, e.g., a vehicle exterior camera configured to be capable of taking pictures of the surroundings of the vehicle 10 or a range sensor, such as LiDAR or radar. The vehicle 10 may be provided with multiple vehicle exterior sensors 13 that differ in detectable range or type. Every time an exterior sensor signal is generated, the vehicle exterior sensor 13 outputs the generated exterior sensor signal to the ECU 17.

The driver monitoring camera 14, which is an example of a vehicle interior sensor, is mounted on or near an instrument panel and oriented to the driver so that the head of the driver sitting on the driver's seat of the vehicle 10 is included in the region to be captured by the camera. The driver monitoring camera 14 may include a light source, such as an infrared LED. Every predetermined capturing period, the driver monitoring camera 14 takes a picture of the driver to generate an image representing the driver (hereafter a "driver image"), and outputs the generated driver image to the ECU 17.

The display device 15 is provided in the interior of the vehicle 10, and includes a display such as a liquid crystal display or an organic EL display. The display device 15 may further include a meter such as a speedometer. The display device 15 is installed in the interior of the vehicle 10, e.g., on the instrument panel, and oriented to the driver. The display device 15 displays various types of information received from the ECU 17 via an in-vehicle network to notify the information to the driver. In the present embodiment, the display device 15 displays at least the speed of the vehicle 10. The vehicle speed may be displayed in analog or digital form.

The sound generator 16 outputs a sound into the interior of the vehicle 10 according to control by the ECU 17. To achieve this, the sound generator 16 includes a generation circuit that generates a sound signal depending on a control signal from the ECU 17, and a speaker that outputs a sound depending on the sound signal generated by the generation circuit.

The ECU 17 can execute, on the vehicle 10, an autonomous driving control process or a driving assistance process including speed control to automatically control the speed of the vehicle 10, such as adaptive cruise control (ACC). The ECU 17 can execute PG driving control while autonomous driving control or vehicle speed control is applied to the vehicle 10.

The ECU 17, which is an example of the display controller or the sound controller, controls display of vehicle speed via the display device 15 or output of sound via the sound generator 16 while PG driving control is applied to the vehicle 10.

The ECU 17 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 17 to another device. The communication interface 21 passes signals from the vehicle speed sensor 12, the vehicle exterior sensor 13, and the driver monitoring camera 14 to the processor 23. In addition, the communication interface 21 outputs a control signal of the power train 11 received from the processor 23 to the power train 11. In addition, the communication interface 21 outputs a speed display signal received from the processor 23 to the display device 15. Further, the communication interface 21 outputs a sound control signal received from the processor 23 to the sound generator 16.

The memory 22, which is an example of a storage unit, includes volatile and nonvolatile semiconductor memories. The memory 22 stores various types of data used in or generated during a display control process or a sound control process executed by the processor 23. In addition, the memory 22 stores various types of data used in or generated during autonomous driving control or speed control of the vehicle 10 executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes a display control process or a sound control process. In addition, the processor 23 executes autonomous driving control or speed control.

First Embodiment

The following describes processing of units of the processor 23 according to a first embodiment. In this embodiment, the ECU 17 functions as a display controller, and the processor 23 executes a display control process while PG driving control is applied to the vehicle 10.

Figure 2:
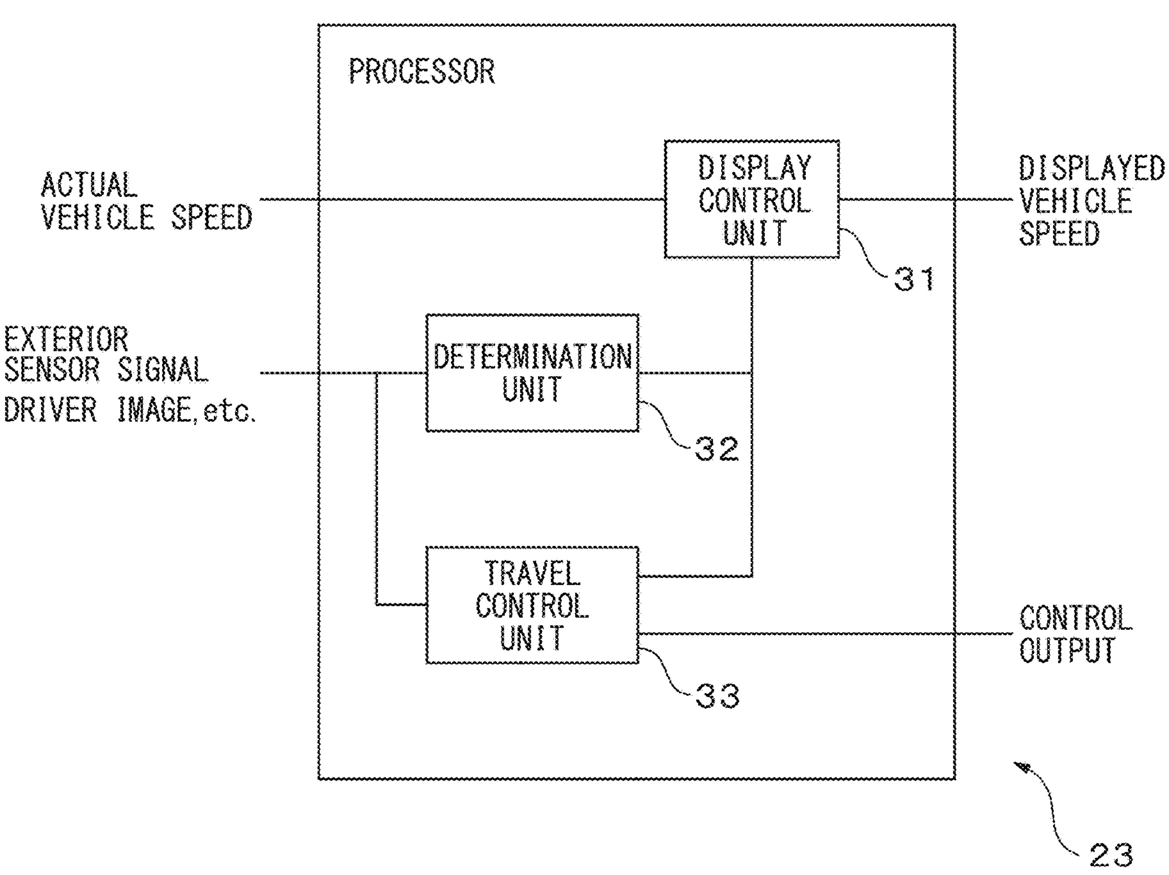
FIG. 2 is a functional block diagram of a processor of the ECU, related to a display control process according to a first embodiment.

FIG. 2 is a functional block diagram of the processor 23, related to a display control process according to the first embodiment. The processor 23 includes a display control unit 31, a determination unit 32, and a travel control unit 33. These units included in the processor 23 are, for example, functional modules implemented by a computer program executed by the processor 23, or may be dedicated operating circuits provided in the processor 23.

The display control unit 31 sets a displayed speed range that is included in and narrower than the range of the actual speed of the vehicle 10 under PG driving control (hereafter the "actual speed range") while PG driving control is applied to the vehicle 10. The display control unit 31 then calculates vehicle speed to be displayed so that the displayed vehicle speed increases during accelerating of the vehicle 10 and decreases during coasting of the vehicle 10 within the displayed speed range.

The actual speed range is set so as to include a target vehicle speed. The target vehicle speed is set by the driver via an operating device (not illustrated) provided in the vehicle interior. Alternatively, when the vehicle 10 is under autonomous driving control, the target vehicle speed may be set to the speed limit of a road section being traveled by the vehicle 10 or a speed that is a predetermined offset subtracted from the speed limit. In this case, the display control unit 31 identifies the road section being traveled by the vehicle 10, by referring to map information and the current position of the vehicle 10. The display control unit 31 uses the speed limit of the identified road section represented in the map information for setting the target vehicle speed. The map information is prestored in the memory 22. Alternatively, the vehicle 10 may include a separate storage device (not illustrated) that stores map information. The display control unit 31 uses the latest position of the vehicle 10 determined by a receiver (not illustrated) of a satellite positioning system, such as a GPS receiver, mounted on the vehicle 10 as the current position of the vehicle 10.

The actual speed range may have, for example, a width of 5% to 10% of a target vehicle speed. The actual speed range is set so that the target vehicle speed is a speed value in the actual speed range, e.g., the median, the lower limit, or the upper limit of the actual speed range. The displayed speed range may be, for example, a range that is 30% to 70% as wide as the actual speed range and that includes the target vehicle speed. In addition, when a non-gazing condition that the driver does not gaze at the display device 15 is satisfied, the display control unit 31 sets the displayed speed range wider than when the non-gazing condition is not satisfied. For example, when the non-gazing condition is not satisfied, the display control unit 31 sets the displayed speed range to a range 50% as wide as the actual speed range; when the non-gazing condition is satisfied, the display control unit sets the displayed speed range to a range 70% as wide as the actual speed range. In this way, when the driver rarely sees the displayed vehicle speed, the display control unit 31 causes the displayed vehicle speed to be close to the actual vehicle speed, and thereby can further reduce the sense of incongruity felt by the driver seeing the displayed vehicle speed. Whether the non-gazing condition is satisfied is determined by the determination unit 32. Details of processing of the determination unit 32 will be described below.

While PG driving control is applied to the vehicle 10 by the travel control unit 33, the display control unit 31 calculates vehicle speed to be displayed, based on the actual speed of the vehicle 10 measured by the vehicle speed sensor 12. In the present embodiment, the display control unit 31 multiplies a value obtained by subtracting the target vehicle speed from the actual vehicle speed by the ratio of the width of the displayed speed range to that of the actual speed range to calculate the difference between the speed to be displayed and the target vehicle speed (hereafter the "displayed speed residual"). The display control unit 31 adds the target vehicle speed to the displayed speed residual to calculate vehicle speed to be displayed. For example, assume that the target vehicle speed Vt is 100 km/h, the actual speed range Rvr is from 95 km/h to 105 km/h, and the displayed speed range Rvd is from 97 km/h to 103 km/h. In this case, when the actual vehicle speed Vr is 105 km/h, the displayed vehicle speed Vd is $(105-100)*(103-97)/(105-95)+100=103$ km/h. The displayed vehicle speed is calculated in this way, and is thus included in the displayed speed range. In addition, the displayed vehicle speed increases with the actual vehicle speed. Thus, when the vehicle 10 accelerates, the displayed vehicle speed increases with the actual vehicle speed. When the vehicle 10 coasts, the displayed vehicle speed decreases with the actual vehicle speed.

In addition, when PG driving control is terminated, the display control unit 31 modifies the displayed vehicle speed to bring the displayed vehicle speed close to the actual speed of the vehicle 10 at a rate of change that is less than or equal to a predetermined upper-limit rate of change. To this end, the display control unit 31 may increase the upper-limit rate of change with the absolute value of the acceleration/deceleration of the vehicle 10. For example, the upper-limit rate of change may be the absolute value of acceleration/deceleration in a most recent predetermined period multiplied by a predetermined constant (e.g., 1.1 to 1.2). In this way, when PG driving control is terminated, the displayed vehicle speed is prevented from changing rapidly compared to changes in actual vehicle speed. The display control unit 31 can therefore prevent the driver from feeling a sense of incongruity of changes in displayed vehicle speed immediately after the end of PG driving control.

Figure 3:
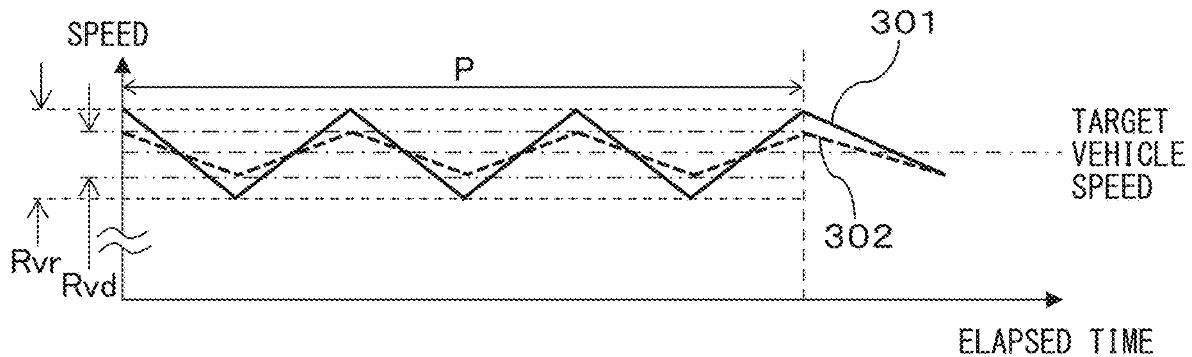
FIG. 3 illustrates an example of the relationship between changes in actual vehicle speed and changes in displayed vehicle speed for the case where pulse and glide driving control is applied to the vehicle.

FIG. 3 illustrates an example of the relationship between changes in actual vehicle speed and changes in displayed vehicle speed for the case where PG driving control is applied to the vehicle 10. In FIG. 3, the abscissa represents elapsed time, and the ordinate represents speed per hour. A graph 301 represents time-varying changes in actual vehicle speed, and a graph 302 represents time-varying changes in displayed vehicle speed. Period P indicates a period during which PG driving control is applied to the vehicle 10.

FIG. 3 suggests that the actual vehicle speed and the displayed vehicle speed vary within ranges including a target vehicle speed in the period P during which PG driving control is applied to the vehicle 10, and that the displayed vehicle speed varies in a displayed speed range Rvd narrower than an actual speed range Rvr in which the actual vehicle speed varies. The figure also suggests that as the vehicle 10 accelerates and the actual vehicle speed increases, the displayed vehicle speed also increases, and conversely, as the vehicle 10 coasts and the actual vehicle speed decreases, the displayed vehicle speed also decreases. This reduces fluctuations in display of speed and the sense of incongruity caused by the difference between the actual vehicle speed and the displayed vehicle speed.

As indicated by the graphs 301 and 302, the displayed vehicle speed gradually approaches the actual vehicle speed after the end of the period P. This prevention of a rapid change in displayed vehicle speed suggests that the driver is unlikely to feel a sense of incongruity of changes in displayed vehicle speed.

The display control unit 31 generates a speed display signal indicating vehicle speed to be displayed, and outputs the speed display signal to the display device 15 via the communication interface 21 to cause the display device 15 to display the vehicle speed.

The determination unit 32 determines whether circumstances of the vehicle 10 or behavior of the driver of the vehicle 10 satisfies the non-gazing condition, at predetermined intervals (e.g., several seconds to several minutes).

In the present embodiment, the determination unit 32 determines that the non-gazing condition is satisfied, when the circumstances of the vehicle 10 correspond to one of the following: the weather is bad, the number of traveling vehicles around the vehicle 10 is greater than or equal to a predetermined number, and the vehicle 10 is traveling on a curved section.

For example, when the rainfall measured by a rainfall sensor (not illustrated) provided on the vehicle 10 is greater than a predetermined bad weather threshold, the determination unit 32 determines that the weather around the vehicle 10 is bad. Alternatively, when the windshield wiper of the vehicle 10 is set to an operating mode in which the windshield wiper operates continuously, the determination unit 32 may determine that the weather around the vehicle 10 is bad. Alternatively, the determination unit 32 may identify whether the weather around the vehicle 10 is bad, by inputting an image generated by the vehicle exterior camera, which is an example of the vehicle exterior sensor 13, configured to take pictures of the surroundings of the vehicle 10 (hereafter an "exterior image") into a classifier that has been trained to identify whether the weather around the vehicle 10 is bad. In this case, the classifier is configured, for example, by a deep neural network (DNN) that has architecture of a convolutional neural network (CNN) type and that includes, in order from the input side, one or more convolution layers and one or more fully-connected layers. Alternatively, the classifier may be configured as one based on a machine learning algorithm other than a DNN, such as a support vector machine. Such a classifier is trained in advance in accordance with a predetermined training algorithm, such as backpropagation, with a large number of training images including exterior images obtained in bad weather and exterior images obtained in weather that is not bad.

To count the number of traveling vehicles around the vehicle 10, the determination unit 32 inputs an exterior image into a classifier that has been trained to detect another vehicle. The determination unit 32 counts the number of vehicles detected by the classifier, and determines that the non-gazing condition is satisfied, when the number of detected vehicles is greater than or equal to a predetermined number. The classifier for detecting another vehicle is configured as a DNN of a CNN type, a DNN having an attention mechanism, or a classifier based on a machine learning algorithm other than a DNN, such as AdaBoost. Such a classifier is also trained in advance in accordance with a predetermined training algorithm with a large number of training images including exterior images representing a vehicle to be detected.

To determine whether the road section being traveled by the vehicle 10 is a curved section, the determination unit 32 identifies the road section being traveled by the vehicle 10, by referring to map information and the current position of the vehicle 10, similarly to setting of a target vehicle speed by the display control unit 31. When the identified road section represented in the map information is a curved section, the determination unit 32 determines that the vehicle 10 is traveling on a curved section, and that the non-gazing condition is satisfied. Alternatively, the determination unit 32 may detect a lane line by inputting an exterior image into a classifier that has been trained to detect a lane line, and determine that the vehicle 10 is traveling on a curved section, when the curvature of a curve that approximates the detected lane line is greater than or equal to a predetermined curvature. Such a classifier may be one configured similarly to the classifier for detecting another vehicle. Alternatively, the classifier for detecting another vehicle may be trained in advance to detect a lane line, too.

Regarding the driver's behavior, when the number of times the driver's line of sight is directed to the display device 15 in a most recent predetermined period (e.g., several dozen seconds to several minutes) is less than or equal to a predetermined number, the determination unit 32 determines that the non-gazing condition is satisfied. Alternatively, when the ratio of a period during which the driver's line of sight is directed away from the display device 15 to the predetermined period is greater than or equal to a predetermined threshold, the determination unit 32 may determine that the non-gazing condition is satisfied.

To detect the direction of the driver's line of sight, the determination unit 32 inputs a driver image into a classifier that has been trained to detect a driver's face from an image, thereby detecting a region representing the driver's eye in the driver image (hereafter an "eye region"). As such a classifier, the determination unit 32 can use, for example, a DNN having architecture of a CNN type, a support vector machine, or an AdaBoost classifier. The determination unit 32 may detect an eye region from a driver image in accordance with another technique to detect an eye region, such as template matching. In addition, the determination unit 32 detects a corneal reflection image of a light source (hereafter a "Purkinje image") and the centroid of the pupil (hereafter simply the "pupillary centroid") from the eye region. Specifically, the determination unit 32 detects a Purkinje image by template matching of the eye region with templates of a Purkinje image. Similarly, the determination unit 32 detects the pupil by template matching of the eye region with templates of a pupil, and determines the centroid of the region representing the detected pupil as the pupillary centroid. The determination unit 32 then calculates the distance between the Purkinje image and the pupillary centroid, and refers to a table representing the relationship between the distance and the direction of a driver's line of sight, thereby detecting the direction of the driver's line of sight. Such a table may be prestored in the memory 22. When the detected direction of the line of sight is within a display direction range corresponding to the direction to the display device 15, the determination unit 32 determines that the driver's line of sight is directed to the display device 15. When the detected direction of the line of sight is outside the display direction range, the determination unit determines that the driver's line of sight is not directed to the display device 15. The display direction range may also be prestored in the memory 22.

By executing the above-described processing on the latest driver image at predetermined intervals (e.g., 100 milliseconds to 1 second), the determination unit 32 determines the number of times the driver's line of sight is directed to the display device 15 or the period during which the driver's line of sight is directed away from the display device 15. More specifically, the determination unit 32 determines the total of individual periods from the time of generation of a driver image when the direction of the driver's line of sight falls outside the display direction range to the time of generation of a driver image when the direction of the driver's line of sight falls within the display direction range in the most recent predetermined period as the period during which the driver's line of sight is directed away from the display device 15. The determination unit 32 determines the number of driver images that are generated in the most recent predetermined period and in which the driver's line of sight is determined to be directed within the display direction range as the number of times the driver's line of sight is directed to the display device 15.

The determination unit 32 notifies the display control unit 31 of the result of determination whether the non-gazing condition is satisfied.

The travel control unit 33 executes PG driving control while autonomous driving control or speed control is applied to the vehicle 10. In particular, the travel control unit 33 executes PG driving control when the vehicle 10 can continue traveling at the target vehicle speed. More specifically, the travel control unit 33 executes PG driving control when the distance between the vehicle 10 and a vehicle traveling ahead of the vehicle 10 on a host vehicle lane being traveled by the vehicle 10 is greater than a distance threshold that enables travel at the target vehicle speed or when no vehicle ahead is traveling on the host vehicle lane and the vehicle 10 need not accelerate or decelerate.

Thus the travel control unit 33 detects traveling vehicles around the vehicle 10 and lane lines by inputting an exterior image, which is an example of the exterior sensor signal, into a classifier, in a manner similar to that described in relation to the determination unit 32. The travel control unit 33 then determines a region sandwiched between two lane lines closest to the vehicle 10 in the exterior image as a host vehicle lane region corresponding to the host vehicle lane. Of the detected vehicles, the travel control unit 33 further identifies a vehicle whose bottom in the exterior image is included in the host vehicle lane region as a vehicle ahead. When a vehicle ahead is detected, the travel control unit 33 estimates the distance between the vehicle 10 and the vehicle ahead, based on parameters such as the mounted position, the orientation, and the angle of view of the vehicle exterior camera, which is an example of the vehicle exterior sensor 13, and on the bottom position of the vehicle ahead in the exterior image. Alternatively, when a range sensor is mounted on the vehicle 10 as a vehicle exterior sensor 13, the travel control unit 33 may determine a distance value measured by the range sensor in the direction to the detected vehicle ahead as the distance between the vehicle 10 and the vehicle ahead.

In addition, the travel control unit 33 determines whether there is a location where acceleration or deceleration is required within a predetermined distance in the travel direction of the vehicle 10, based on map information, the latest position of the vehicle 10 determined by the receiver (not illustrated) of a satellite positioning system, and the travel direction of the vehicle 10 measured by an orientation sensor (not illustrated) mounted on the vehicle 10. A location where deceleration is required may be, for example, one where a stop line is drawn or where a tollgate of an expressway is built. When there is not such a location where deceleration is required, the travel control unit 33 determines that the vehicle 10 need not decelerate.

The travel control unit 33 may execute PG driving control only when the operating device provided in the vehicle interior is operated by the driver to approve of execution of PG driving control.

When execution of PG driving control is started, the travel control unit 33 notifies the start to the display control unit 31. The travel control unit 33 then accelerates the vehicle 10 at predetermined target acceleration during execution of PG driving control until the actual speed of the vehicle 10 reaches the upper limit of the actual speed range. To achieve this, the travel control unit 33 generates a control signal for controlling the power train 11 so that acceleration measured by an acceleration sensor (not illustrated) mounted on the vehicle 10 approaches the target acceleration. Specifically, the travel control unit 33 generates the control signal according to feedback control, such as PID control. The travel control unit 33 outputs the generated control signal to the power train 11.

When the actual speed of the vehicle 10 measured by the vehicle speed sensor 12 reaches the upper limit of the actual speed range, the travel control unit 33 controls the power train 11 to coast the vehicle 10. More specifically, the travel control unit 33 generates a control signal corresponding to the smallest accelerator opening, outputs the control signal to the power train 11. When the speed of the vehicle 10 measured by the vehicle speed sensor 12 reaches the lower limit of the actual speed range, the travel control unit 33 controls the power train 11 to accelerate the vehicle 10 at the predetermined target acceleration. In this way, while PG driving control is applied, the travel control unit 33 controls the power train 11 so that the actual speed of the vehicle 10 is within the actual speed range, and that the vehicle 10 repeats accelerating and coasting alternately.

The travel control unit 33 terminates PG driving control when the distance between the vehicle ahead and the vehicle 10 on the host vehicle lane falls below the distance threshold or when the distance from the current position of the vehicle 10 to a location where deceleration is required falls below the predetermined distance. Alternatively, the travel control unit 33 may also terminate PG driving control when the driver operates the operating device to terminate PG driving control or presses down the accelerator pedal or the brake pedal by more than a predetermined amount. When execution of PG driving control is terminated, the travel control unit 33 notifies the termination to the display control unit 31.

FIG. 4 is an operation flowchart of the display control process according to the first embodiment. While PG driving control is executed, the processor 23 executes the display control process in accordance with this operation flowchart.

The determination unit 32 determines whether the non-gazing condition is satisfied (step S101). When the non-gazing condition is satisfied (Yes in step S101), the display control unit 31 sets a displayed speed range that is narrower than the actual speed range and relatively wide (step S102). When the non-gazing condition is not satisfied (No in step S101), the display control unit 31 sets a displayed speed range that is narrower than the actual speed range and relatively narrow (step S103). The display control unit 31 causes the display device 15 to display vehicle speed so that the displayed vehicle speed increases during accelerating and decreases during coasting within the displayed speed range (step S104). The processor 23 then repeats the processing of step S101 and the subsequent steps.

As has been described above, the display controller according to the first embodiment sets a displayed speed range narrower than the actual speed range of the vehicle while PG driving control is applied to the vehicle. In addition, the display controller causes the display device to display vehicle speed so that the displayed vehicle speed increases during accelerating of the vehicle and decreases during coasting thereof within the displayed speed range. In this way, the display controller makes the displayed vehicle speed vary consistently with and more slowly than the actual vehicle speed, and thereby can reduce fluctuations in displayed vehicle speed and the driver's sense of incongruity.

According to a modified example, the display control unit 31 may narrow the displayed speed range as the number of times the driver's line of sight is directed to the display device 15 in a most recent predetermined period increases or the ratio of the period during which the driver's line of sight is directed away from the display device 15 to the most recent predetermined period decreases. Further, the display control unit 31 may set the displayed speed range, based on only the actual speed range and a target vehicle speed, regardless of whether the non-gazing condition is satisfied.

In this case, processing of the determination unit 32 may be omitted. Thus, computational burden of the processor 23 is reduced according to this modified example.

Second Embodiment

The following describes processing of units of the processor 23 according to a second embodiment. In this embodiment, the ECU 17 functions as a sound controller. The processor 23 executes a sound control process while the vehicle 10 is under PG driving control. The following describes the differences from the first embodiment.

Figure 5:
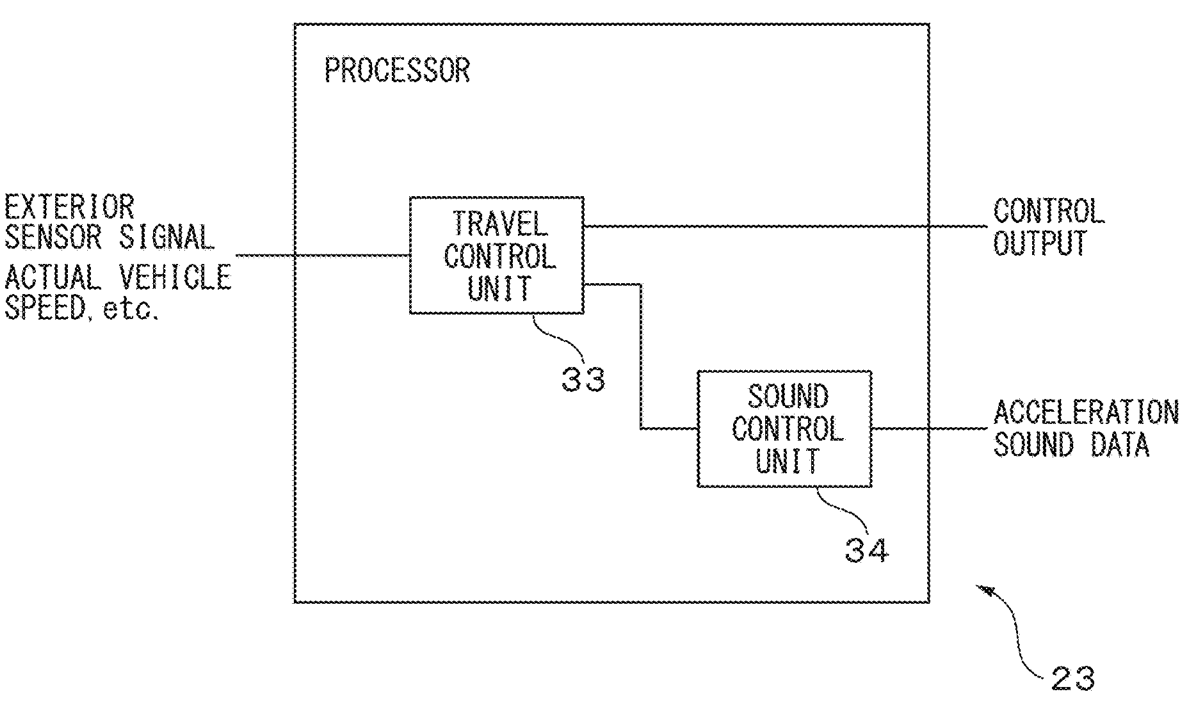
FIG. 5 is a functional block diagram of the processor of the ECU, related to a sound control process according to a second embodiment.

FIG. 5 is a functional block diagram of the processor 23, related to a sound control process according to the second embodiment. The processor 23 includes a sound control unit 34 and a travel control unit 33. These units included in the processor 23 are, for example, functional modules implemented by a computer program executed by the processor 23, or may be dedicated operating circuits provided in the processor 23.

When notified by the travel control unit 33 of transfer to coasting during execution of PG driving control, the sound control unit 34 causes the sound generator 16 to output an artificial acceleration sound, which is artificial reproduction of a sound made during accelerating of the vehicle 10, in the interior of the vehicle 10. Thus, acceleration sound data for causing the sound generator 16 to produce an artificial acceleration sound is prestored in the memory 22, and the sound control unit 34 outputs a sound control signal including the acceleration sound data to the sound generator 16 during coasting of the vehicle 10. When notified by the travel control unit 33 of transfer to accelerating during execution of PG driving control, the sound control unit 34 stops outputting a sound control signal to stop the sound generator 16 outputting the artificial acceleration sound.

As noise during travel is louder, the driver is less likely to notice changes in sound made by the power train 11 of the vehicle 10. Thus the sound control unit 34 may make volume of the artificial acceleration sound outputted from the sound generator 16 lower as noise made during travel of the vehicle 10 is louder.

The sound control unit 34 estimates the noise level during travel of the vehicle 10, based on the actual speed of the vehicle 10 or unevenness of the surface of the road being traveled by the vehicle 10. In general, as the actual vehicle speed is greater, noise during travel is louder. Thus the sound control unit 34 controls the sound generator 16 so that the volume of the artificial acceleration sound is lower as the actual speed of the vehicle 10 measured by the vehicle speed sensor 12 is greater.

As the level of unevenness of the road surface is higher, noise during travel is louder. As the level of unevenness of the road surface is higher, the amount of short-period variation in wheel speed measured by the vehicle speed sensor 12 together with actual vehicle speed is larger. Further, as the level of unevenness of the road surface is higher, the range of variation in the acceleration of the vehicle 10 measured by the acceleration sensor is also wider. Thus the sound control unit 34 executes FFT on measured values of wheel speed in a most recent predetermined period to calculate frequency components of variation in wheel speed. The sound control unit 34 then controls the sound generator 16 so that the volume of the artificial acceleration sound is lower as the component of variation in wheel speed of a predetermined frequency (e.g., several hundred hertz) is greater. Alternatively, the sound control unit 34 may control the sound generator 16 so that the volume of the artificial acceleration sound is lower as the sum of the absolute values of the amounts of variation in acceleration between individual sampling points included in the most recent predetermined period is greater.

In this way, the sound control unit 34 reduces the volume of the artificial acceleration sound under circumstances where the driver is unlikely to notice a reduction in the volume even if it is reduced. The sound control unit 34 can therefore make it difficult for the driver to notice switching between accelerating and coasting, and reduce unnecessary electricity consumption.

Figure 6:
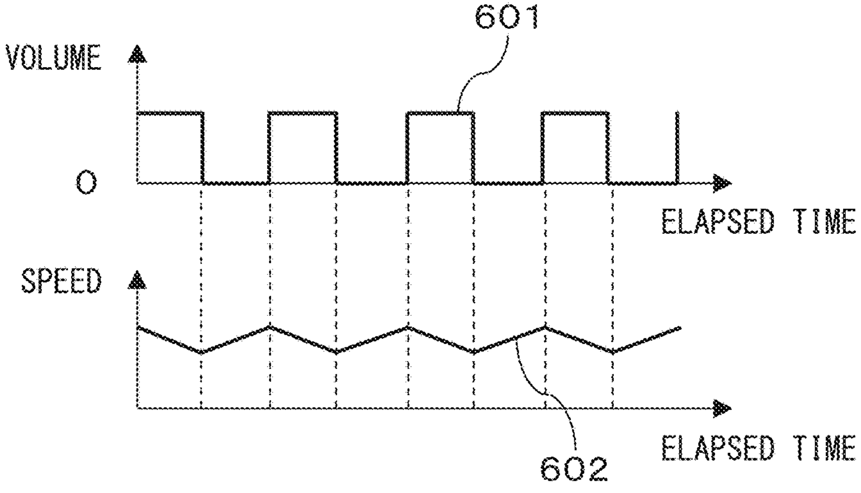
FIG. 6 illustrates an example of the relationship between changes in actual vehicle speed and output of an artificial acceleration sound for the case where pulse and glide driving control is applied to the vehicle.

FIG. 6 illustrates an example of the relationship between changes in actual vehicle speed and output of an artificial acceleration sound for the case where PG driving control is applied to the vehicle 10. In FIG. 6, the abscissa represents elapsed time. The ordinate in the upper graph represents volume, and the ordinate in the lower graph represents speed. The upper graph 601 represents time-varying changes in the artificial acceleration sound outputted from the sound generator 16, and the lower graph 602 represents time-varying changes in the actual speed of the vehicle 10. As illustrated in FIG. 6, the artificial acceleration sound is outputted while the vehicle 10 is decelerating by coasting. This makes it difficult to distinguish between the sound made during accelerating and the sound made during coasting. As a result, the driver is unlikely to notice switching between accelerating and coasting.

When PG driving control is started, the travel control unit 33 notifies the start to the sound control unit 34. This enables the sound control unit 34 to execute the sound control process during execution of PG driving control. Upon transfer from coasting to accelerating, the travel control unit 33 notifies the transfer to the sound control unit 34. Upon transfer from accelerating to coasting, the travel control unit 33 notifies the transfer to the sound control unit 34. When PG driving control is terminated, the travel control unit 33 notifies the termination to the sound control unit 34.

Figure 7:
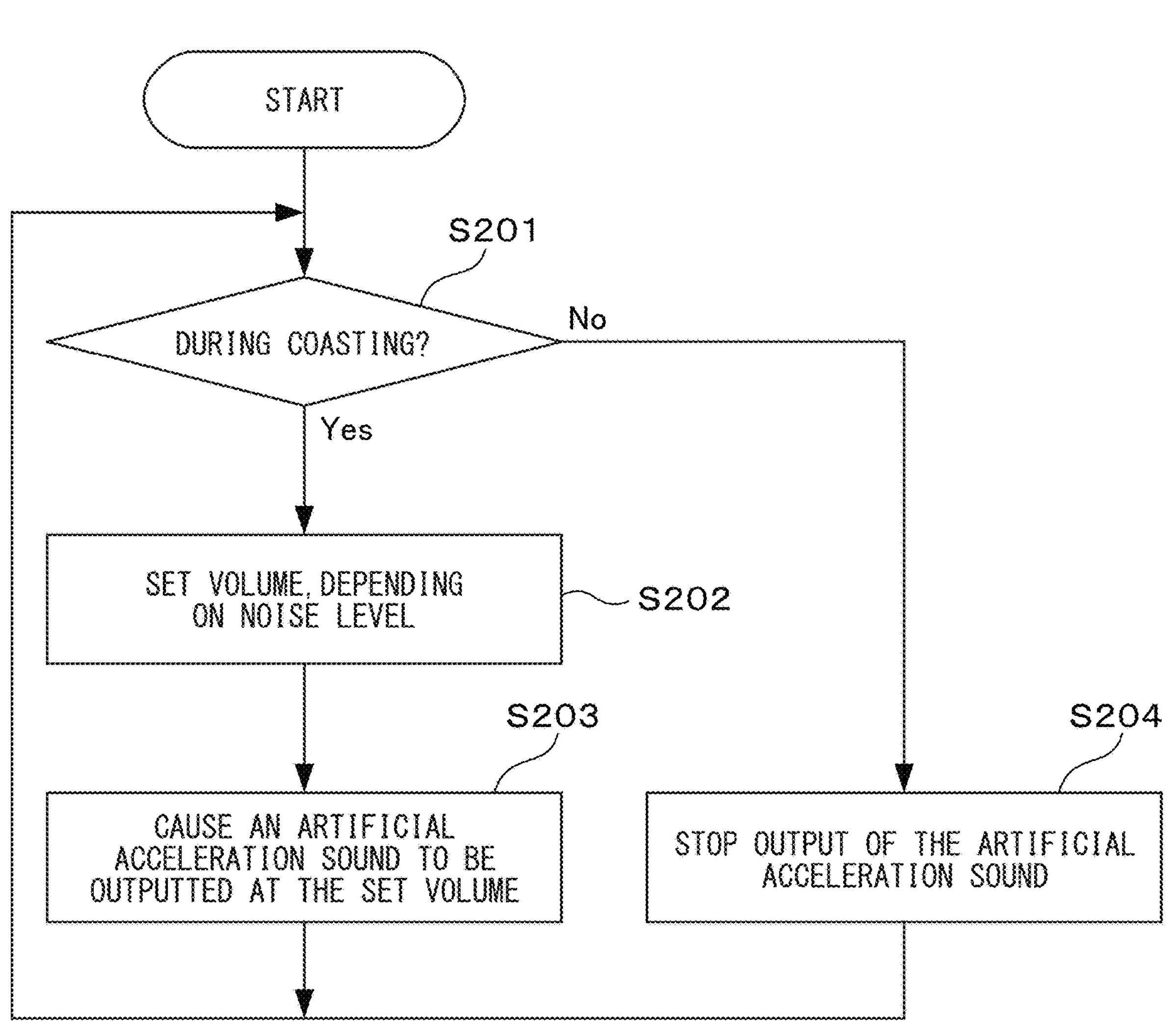
FIG. 7 is an operation flowchart of the sound control process according to the second embodiment.

FIG. 7 is an operation flowchart of the sound control process according to the second embodiment. While PG driving control is executed, the processor 23 executes the sound control process in accordance with this operation flowchart.

The sound control unit 34 determines whether the vehicle 10 is coasting or accelerating, based on notification from the travel control unit 33 (step S201). When the vehicle 10 is coasting (Yes in step S201), the sound control unit 34 sets the volume of the artificial acceleration sound, based on the noise level during travel of the vehicle 10 (step S202). The sound control unit 34 then causes the sound generator 16 to output an artificial acceleration sound at the set volume (step S203). When the vehicle 10 is accelerating (No in step S201), the sound control unit 34 stops the sound generator 16 outputting the artificial acceleration sound (step S204). After step S203 or S204, the processor 23 repeats the processing of step S201 and the subsequent steps.

As has been described above, the sound controller according to the second embodiment causes the sound generator to output an artificial acceleration sound during coasting while PG driving control is applied to the vehicle. The sound controller can therefore make it difficult for the driver to notice switching between accelerating and coasting.

According to a modified example, the sound control unit 34 may cause the sound generator 16 to output an artificial acceleration sound even during accelerating of the vehicle 10 while PG driving control is applied to the vehicle 10. However, in this case, the sound control unit 34 controls the sound generator 16 so that the volume of the artificial acceleration sound is lower when the vehicle 10 is accelerating than when the vehicle 10 is coasting. This makes the driver less likely to notice switching between accelerating and coasting.

The processor 23 of the ECU 17 may simultaneously execute display control according to the first embodiment or its modified example and sound control according to the second embodiment or its modified example. In other words, the processor 23 may include the display control unit 31, the determination unit 32, the travel control unit 33, and the sound control unit 34. More specifically, while PG driving control is applied to the vehicle 10, the processor 23 sets a displayed speed range narrower than the actual speed range of the vehicle and causes the display device 15 to display vehicle speed so that the displayed vehicle speed increases during accelerating of the vehicle and decreases during coasting thereof. In addition, the processor 23 causes the sound generator 16 to output an artificial acceleration sound during coasting of the vehicle 10.

The computer program for achieving the functions of the processor 23 of the ECU 17 according to the above-described embodiments or modified examples may be provided in a form recorded on a computer-readable portable storage medium, such as a semiconductor memory, a magnetic medium, or an optical medium.

What is claimed is:

1. A display controller comprising a processor configured to: cause a display device to display a displayed vehicle speed that is a function of an actual speed of the vehicle, the displayed vehicle speed increasing during accelerating of a vehicle and decreasing during coasting of the vehicle within a displayed speed range that is defined by the function, the displayed speed range included in and narrower than a predetermined actual speed range of the actual speed of the vehicle while the vehicle is under pulse and glide driving control to repeat accelerating and coasting within the predetermined actual speed range.

2. The display controller according to claim 1, wherein the processor is further configured to determine whether circumstances of the vehicle or behavior of a driver of the vehicle satisfies a non-gazing condition that the driver does not gaze at the display device, wherein the processor sets the displayed speed range so that the displayed speed range when the non-gazing condition is satisfied is wider than the displayed speed range when the non-gazing condition is not satisfied.

3. The display controller according to claim 1, wherein when the pulse and glide driving control is terminated, the processor brings the displayed vehicle speed close to actual speed of the vehicle at a rate of change that is less than or equal to a predetermined upper-limit rate of change.

4. A method for controlling display, comprising causing a display device to display a displayed vehicle speed that is a function of an actual speed of the vehicle, the displayed vehicle speed increasing during accelerating of a vehicle and decreasing during coasting of the vehicle within a displayed speed range that is defined by the function, the displayed speed range included in and narrower than a predetermined actual speed range of the actual speed of the vehicle while the vehicle is under pulse and glide driving control to repeat accelerating and coasting within the predetermined actual speed range.

5. A non-transitory recording medium that stores a computer program for controlling display, the computer program causing a processor mounted on a vehicle to execute a process comprising causing a display device to display a displayed vehicle speed that is a function of an actual speed of the vehicle, the displayed vehicle speed increasing during accelerating of the vehicle and decreasing during coasting of the vehicle within a displayed speed range that is defined by the function, the displayed speed range included in and narrower than a predetermined actual speed range of the actual speed of the vehicle while the vehicle is under pulse and glide driving control to repeat accelerating and coasting within the predetermined actual speed range.

* * * * *